US009239241B2

(12) United States Patent
Sumizawa

(10) Patent No.: US 9,239,241 B2
(45) Date of Patent: Jan. 19, 2016

(54) NAVIGATION SYSTEM

(71) Applicant: Clarion Co., Ltd., Bunkyo-ku, Tokyo (JP)

(72) Inventor: Akio Sumizawa, Sagamihara (JP)

(73) Assignee: Clarion Co., Ltd., Tokyo (JP)

(*) Notice: Subject to any disclaimer, the term of this patent is extended or adjusted under 35 U.S.C. 154(b) by 48 days.

(21) Appl. No.: 14/106,290

(22) Filed: Dec. 13, 2013

(65) Prior Publication Data

US 2014/0100772 A1 Apr. 10, 2014

Related U.S. Application Data

(63) Continuation of application No. 12/892,670, filed on Sep. 28, 2010, now Pat. No. 8,634,984.

(30) Foreign Application Priority Data

Sep. 29, 2009 (JP) .................................. 2009-225204
Sep. 29, 2009 (JP) .................................. 2009-225205

(51) Int. Cl.
*G01C 21/34* (2006.01)
*G08G 1/0968* (2006.01)

(52) U.S. Cl.
CPC ........... *G01C 21/34* (2013.01); *G08G 1/096888* (2013.01)

(58) Field of Classification Search
CPC ............................ G01C 21/3492; G08G 1/123
USPC ......... 701/31.4, 423, 425; 340/995.1, 995.13, 340/994
See application file for complete search history.

(56) References Cited

U.S. PATENT DOCUMENTS 7,355,528 B2 * 4/2008 Yamane ............. G01C 21/3492
340/995.1
7,822,540 B2 10/2010 Fukaya et al.
7,894,981 B2 2/2011 Yamane et al.
(Continued)

FOREIGN PATENT DOCUMENTS

JP 2003-21524 A 1/2003
JP 2004-226302 A 8/2004
(Continued)

OTHER PUBLICATIONS

Japanese Office Action dated Jul. 29, 2014, with English translation (seven (7) pages).

(Continued)

*Primary Examiner* — Thomas G Black
*Assistant Examiner* — Wae Louie
(74) *Attorney, Agent, or Firm* — Crowell & Moring LLP

(57) ABSTRACT

A navigation system includes: a storage unit having stored therein roadmap data, first statistical traffic information data pertaining to a first area which are created based upon a first standard related to a time applicable to the first area, and second statistical traffic information data pertaining to a second area which are created based upon a second standard related to a time applicable to the second area; a search unit that searches for a recommended route; and an estimated time of arrival calculation unit that calculates an estimated time of arrival based upon the roadmap data, the first statistical traffic information data and the second statistical traffic information data. The estimated time of arrival calculation unit executes calculation processing of the estimated time of arrival in compliance with the first standard and the second standard.

20 Claims, 11 Drawing Sheets

(56) References Cited

U.S. PATENT DOCUMENTS

| | | | |
|---|---|---|---|
| 7,899,611 B2 | 3/2011 | Downs et al. | |
| 8,634,984 B2* | 1/2014 | Sumizawa | G08G 1/096888 340/994 |
| 2004/0148098 A1 | 7/2004 | Yato | |
| 2005/0206534 A1 | 9/2005 | Yamane et al. | |
| 2006/0025925 A1 | 2/2006 | Fushiki et al. | |
| 2007/0162222 A1 | 7/2007 | Endo et al. | |
| 2008/0077314 A1 | 3/2008 | Ishikawa | |
| 2008/0208453 A1 | 8/2008 | Fujimoto | |
| 2009/0037100 A1 | 2/2009 | Fujiwara et al. | |
| 2011/0040438 A1 | 2/2011 | Kluge et al. | |
| 2011/0077855 A1 | 3/2011 | Sumizawa | |
| 2011/0246054 A1 | 10/2011 | Toma | |
| 2014/0100772 A1* | 4/2014 | Sumizawa | G01C 21/34 701/410 |
| 2014/0309929 A1* | 10/2014 | Ricci | G07C 9/00158 701/425 |

FOREIGN PATENT DOCUMENTS

| | | | |
|---|---|---|---|
| JP | 2004-239741 | A | 8/2004 |
| JP | 2005-121425 | A | 5/2005 |
| JP | 2006-39978 | A | 2/2006 |
| JP | 2008-83918 | A | 4/2008 |
| JP | 2008-96445 | A | 4/2008 |
| JP | 2008-209360 | A | 9/2008 |
| JP | 2006-241466 | A | 10/2008 |
| JP | 2008-241466 | A | 10/2008 |
| JP | 2009-31039 | A | 2/2009 |
| JP | 4297513 | B1 | 7/2009 |
| JP | 2011-75324 | A | 4/2011 |
| WO | WO 2007/043398 | A1 | 4/2007 |

OTHER PUBLICATIONS

The Extended European Search Report dated Feb. 3, 2011 (6 pages).

* cited by examiner

FIG. 9A

| ⋮ | ⋮ |
|---|---|
| AUGUST 28 (THURSDAY), 2008 | WEEKDAY (REGULAR DAY) |
| AUGUST 29 (FRIDAY), 2008 | WEEKDAY (DAY BEFORE HOLIDAY) |
| AUGUST 30 (SATURDAY), 2008 | HOLIDAY (FIRST DAY OF CONSECUTIVE HOLIDAYS) |
| AUGUST 31 (SUNDAY), 2008 | HOLIDAY (MIDDLE DAY OF CONSECUTIVE HOLIDAYS) |
| SEPTEMBER 1 (MONDAY), 2008 | HOLIDAY (LAST DAY OF CONSECUTIVE HOLIDAYS) |
| ⋮ | ⋮ |

FIG. 9B

| ⋮ | ⋮ |
|---|---|
| AUGUST 28 (THURSDAY), 2008 | WEEKDAY (DAY BEFORE HOLIDAY) |
| AUGUST 29 (FRIDAY), 2008 | HOLIDAY (FIRST DAY OF CONSECUTIVE HOLIDAYS) |
| AUGUST 30 (SATURDAY), 2008 | HOLIDAY (MIDDLE DAY OF CONSECUTIVE HOLIDAYS) |
| AUGUST 31 (SUNDAY), 2008 | HOLIDAY (MIDDLE DAY OF CONSECUTIVE HOLIDAYS) |
| SEPTEMBER 1 (MONDAY), 2008 | HOLIDAY (LAST DAY OF CONSECUTIVE HOLIDAYS) |
| ⋮ | ⋮ |

NAVIGATION SYSTEM

CROSS-REFERENCE TO RELATED APPLICATIONS

This application is a continuation of U.S. application Ser. No. 12/892,670, filed Sep. 28, 2010, which claims priority to Japanese Patent Application No. 2009-225204, filed Sep. 29, 2009, and Japanese Patent Application No. 2009-225205, filed Sep. 29, 2009, the entire disclosures of which are herein expressly incorporated by reference.

BACKGROUND OF THE INVENTION

1. Field of the Invention

The present invention relates to a navigation system that executes a route search by using statistical traffic information.

2. Description of Related Art

A navigation system may be capable of executing a route search operation and a required traveling time calculation by taking into consideration traffic congestion conditions based upon traffic information. However, while the route search operation and the required traveling time calculation are executed based upon the traffic information available at the time of the route search operation, the congestion conditions may change significantly while the vehicle is en route. Japanese Laid Open Patent Publication No. 2008-96445 discloses a technology whereby traffic information collected in the past is accumulated as statistical data, statistical data for individual links are extracted in correspondence to specific traffic information collection conditions having been selected, changes in the congestion conditions corresponding to various time points are superimposed over a map on display and a search for a shortest route is executed with accuracy.

In addition, while the congestion conditions are bound to change as time passes following the time point at which the traffic information is obtained, an accurate search for a recommended route may be executed based upon statistical traffic data collected in the past, which correspond to a specific category of day, e.g., a weekday or a holiday, as disclosed in Japanese Laid Open Patent Publication No. 2004-239741.

SUMMARY OF THE INVENTION

Statistical traffic data must be used by taking into consideration time-related conditions at the start point and the destination that may not always match, e.g., the start point and the destination may be located in different time zones or located in areas observing different holidays. According to the invention disclosed in Japanese Laid Open Patent Publication No. 2008-96445, the route search is executed at the time of departure by using statistical traffic data based upon the current time point designated as a departure time point or a departure time point entered by the user. This means that the route search will be executed by using the statistical traffic data based upon the wrong time if the vehicle is to cross over into a different time zone as it travels or if the vehicle traveling in an area observing daylight saving time is to move into an area where the daylight saving time is not implemented.

The second conversion table correlating dates with specific day categories according to the invention disclosed in Japanese Laid Open Patent Publication No. 2004-239741 remains unchanged unless the user performs a specific operation. This gives rise to an issue in that the route search is likely to be executed by using the statistical traffic data based upon the wrong day category as the vehicle crosses over a border into a region where different holidays are observed or crosses over a border into another country.

According to the first aspect of the present invention, a navigation system comprises: a storage unit having stored therein roadmap data expressing a road map between a start point, from which a mobile body departs, and a destination for the mobile body, first statistical traffic information data pertaining to a first area where the start point is located, which are created based upon a first standard related to a time applicable to the first area, and second statistical traffic information data pertaining to a second area where the destination is located, which are created based upon a second standard related to a time applicable to the second area; a search unit that searches, based upon the roadmap data, for a recommended route for the mobile body traveling from the start point to the destination; and an estimated time of arrival calculation unit that calculates an estimated time of arrival at which the mobile body, traveling through the recommended route, is expected to arrive at the destination, based upon the roadmap data, the first statistical traffic information data and the second statistical traffic information data. The estimated time of arrival calculation unit executes calculation processing of the estimated time of arrival based upon the first statistical traffic information data in compliance with the first standard and calculates the estimated time of arrival based upon results of the calculation processing having been executed and the second statistical traffic information data in compliance with the second standard.

According to the second aspect of the present invention, in the navigation system according to the first aspect, it is preferred that the navigation system further comprises: a clocking unit that clocks in a departure time point at which the mobile body departs the start point in reference to a start point local standard time in a time zone where the start point is located; an estimated passing time point calculation unit that calculates, in reference to the start point local standard time, a first estimated passing time point, indicating an estimated time point at which the mobile body is expected to pass through a waypoint on the recommended route through calculation of a traveling time length executed by referencing the first statistical traffic information data based upon the departure time point; and an acquisition unit that references the second statistical traffic information data in conjunction with a second estimated passing time point obtained by converting the first estimated passing time point to a time point in compliance with destination local standard time in a time zone where the destination is located when calculating a traveling time length and obtains the estimated time of arrival in the destination local standard time. The first standard is the start point local standard time; the second standard is the destination local standard time; and the estimated time of arrival calculation unit includes the estimated passing time point calculation unit and the acquisition unit.

According to the third aspect of the present invention, in the navigation system according to the first aspect, it is preferred that the navigation system further comprises: a clocking unit that clocks in a departure time point at which the mobile body departs the start point in reference to a start point local standard time in a time zone where the start point is located. The first standard is the start point local standard time; and the second standard is a destination local standard time in the time zone where the destination is located; and the search unit searches for the traveling route by searching for a route segment extending from the start point to a waypoint on the recommended route through which the mobile body is to pass, based upon the departure time point, the first statistical traffic information data, and the start point local standard time, calculating a first estimated passing time point at which the mobile body is expected to pass through the waypoint and searching for a route segment extending from the waypoint to the destination based upon a second estimated passing time point obtained through conversion of the first estimated passing time point to a time point in compliance with the destination local standard time, the second statistical traffic information data and the destination local standard time.

According to the fourth aspect of the present invention, in the navigation system according to the first aspect, it is preferred that the navigation system further comprises: a clocking unit that clocks in a first departure time point at which the mobile body departs the start point in reference to a start point local standard time in a time zone where the start point is located; a first time point calculation unit that calculates a traveling time length by referencing the first statistical traffic information data and the second statistical traffic information data in conjunction with a second departure time point obtained through conversion of the first departure time point to a time point in compliance with a global standard time so as to calculate a first expected arrival time point indicating a time point at which the mobile body is expected to arrive at the destination in the global standard time; and a second time point acquisition unit that obtains a second expected arrival time point calculated by converting the first expected arrival time point to a time point in compliance with destination local standard time in a time zone where the destination is located. Both the first standard and the second standard are the global standard time; the estimated time of arrival calculation unit includes the first time point calculation unit and the second time point acquisition unit; and the estimated time of arrival is the second expected arrival time point.

According to the fifth aspect of the present invention, in the navigation system according to the first aspect, it is preferred that the navigation system further comprises: a clocking unit that clocks in a first departure time point at which the mobile body departs the start point in reference to a start point local standard time in a time zone where the start point is located. Both the first standard and the second standard are global standard time; and the search unit searches for the traveling route based upon a second departure time point obtained by converting the first departure time point to a time point in global standard time, the first statistical traffic information data and the second statistical traffic information data, and the global standard time.

According to the sixth aspect of the present invention, in the navigation system according to the first aspect, it is preferred that the navigation system further comprises: a detection unit that detects a position of the mobile body; a selection unit that selects first calendar data corresponding to the first area and second calendar data corresponding to the second area among sets of calendar data for a plurality of regions; a determining unit that determines a first day category corresponding to a traveling date on which the mobile body travels through a first road segment present in the first area along the recommended route and a second day category corresponding to a traveling date on which the mobile body travels through a second road segment present in the second area along the recommended route by referencing the first calendar data and the second calendar data having been selected by the selection unit; and an arithmetic operation unit that calculates an estimated time of arrival at which the mobile body is expected to arrive at the destination based upon the first day category and the second day category determined by the determining unit, time points at which the mobile body is to travel through the first road segment and the second road segment, and the first statistical traffic information data and the second statistical traffic information data. The start point is the position of the mobile body detected by the detection unit; the first calendar data related to a calendar observed in the first area and the first day category and the second calendar data related to a calendar observed in the second area and the second day category are stored in the storage unit; the first standard is the first day category; the second standard is the second day category; and the estimated time of arrival calculation unit includes the arithmetic operation unit.

According to the seventh aspect of the present invention, in the navigation system according to the sixth aspect, it is preferred that the selection unit identifies a region through which the recommended route extends based upon the road-map data.

According to the eighth aspect of the present invention, in the navigation system according to the sixth aspect, it is preferred that the navigation system further comprises: an interface unit that accepts an instruction entered by a user to specify the first area and the second area.

According to the ninth aspect of the present invention, in the navigation system according to the first aspect, it is preferred that the navigation system further comprises: a detection unit that detects a position of the mobile body; a selection unit that selects first calendar data corresponding to the first area and second calendar data corresponding to the second area among sets of calendar data for a plurality of regions; and a determining unit that determines a first day category corresponding to a traveling date on which the mobile body travels through a first road segment present in the first area along the recommended route and a second day category corresponding to a traveling date on which the mobile body travels through a second road segment present in the second area along the recommended route by referencing the first calendar data and the second calendar data having been selected by the selection unit. The start point is the position of the mobile body detected by the detection unit; the first calendar data related to a calendar observed in the first area and the first day category and the second calendar data related to a calendar observed in the second area and the second day category are stored in the storage unit; the first standard is the first day category; the second standard is the second day category; and the search unit searches for the recommended route based upon the first day category and the second day category having been determined by the determining unit, time points at which the mobile body is to travel through the first road segment and the second road segment, and the first statistical traffic information data and the second statistical traffic information data.

BRIEF DESCRIPTION OF THE DRAWINGS

FIGS. 9A and 9B each present an example of a day category registration table that may be stored in the auxiliary storage device.

DESCRIPTION OF PREFERRED EMBODIMENTS

Figure 1:
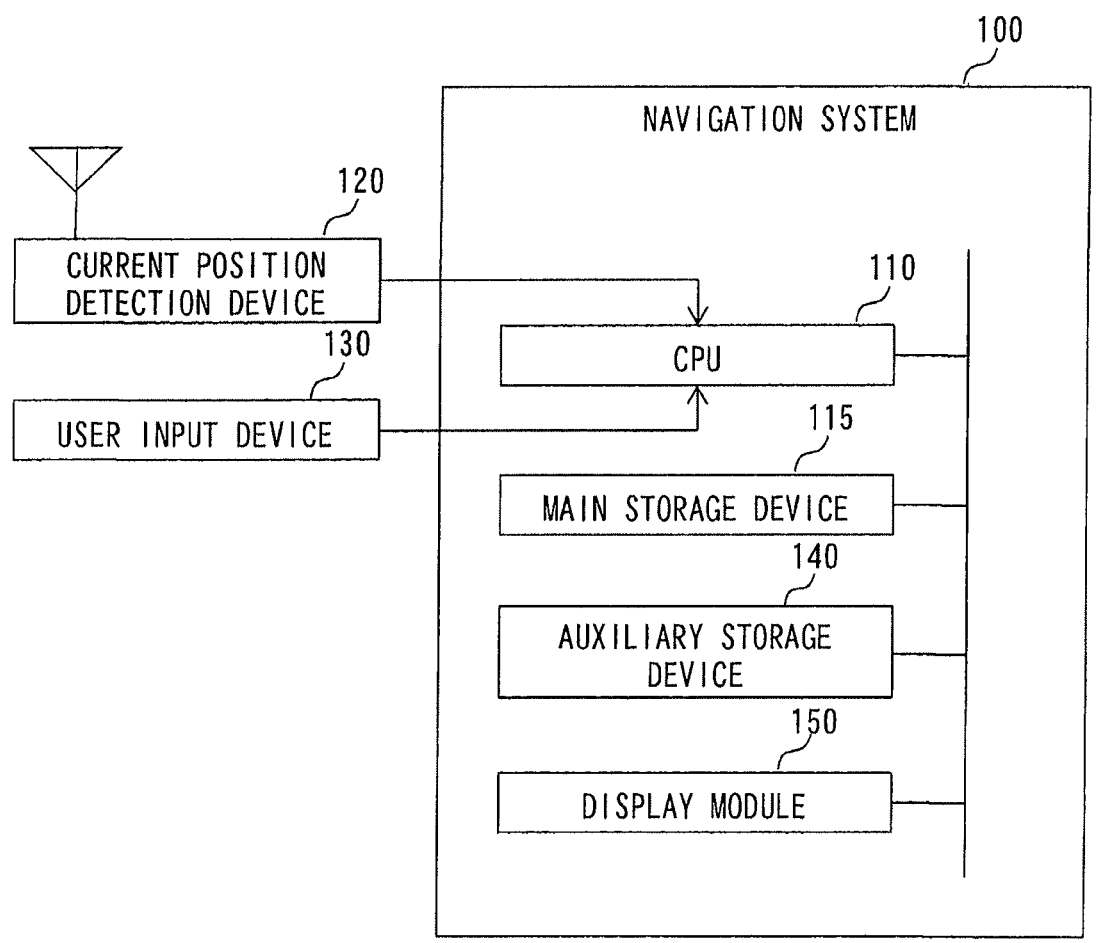
FIG. 1 shows a configuration of a navigation system that may be adopted in an embodiment of the present invention.

FIG. 1 shows the configuration of a navigation system 100 in reference to which a first embodiment and a second embodiment are to be described.

-First Embodiment-

In reference to FIGS. 1 through 6, the first embodiment of the navigation system according to the present invention, which is installed in a vehicle, is described. A CPU 110 in FIG. 1 is an arithmetic operation processing device that controls the entire navigation system 100. The CPU 110 and its peripheral devices are connected with one another via a bus. The peripheral devices include a main storage device 115, an auxiliary storage device 140 and a display module 150. The main storage device 115 is constituted with a work memory used as a work area by the CPU 110 and a program memory where a control program is stored.

Signals originating from a current position detection device 120 and a user input device 130 are input to the CPU 110. The current position detection device 120 may be constituted with, for instance, a GPS sensor, a gyro sensor and a vehicle speed sensor. Time point data are included in the data input from the GPS sensor, and the CPU 110 has a clock function for correcting the current time point based upon the time point data, i.e., the CPU 110 is equipped with an internal clock and a calendar function. The user input device 130 may be constituted with a touch panel, pushbutton switches disposed around the panel, a remote control unit and a joystick.

The auxiliary storage device 140 is a storage device in which roadmap data and POI (point of interest) information, i.e. information related to sightseeing spots and various types of facilities, to be used in navigation processing are stored. The auxiliary storage device 140 may be a hard disk drive, a CD or DVD in which roadmap data are stored, a flash memory or another type of recording medium, or a reader device capable of reading out roadmap data.

Roadmap data provide information related to maps and include map display data, route search data and guidance data. The map display data are used to display roads and backgrounds in a road map. The route search data, which include branch information not directly related to road shapes, are mainly used when calculating through arithmetic operation a recommended route, i.e., when executing a route search. The guidance data include information indicating intersection names, road names, direction names and landmarks and are used when providing route guidance to the user based upon the recommended route having been calculated.

A given road in the roadmap data is expressed as link string data with intersections and the like defined as nodes and road segments extending between nodes defined as links. A set of link string data is thus constituted with node data and link data. Node data and link data, grouped into units of mesh areas each assigned with a specific mesh code, are stored as the roadmap data. The term "mesh area" is used to refer to each of areas assuming a predetermined areal range, into which a road map is partitioned. In a mesh code storage area, a number identifying the corresponding mesh area is stored. In a link string data storage area, coordinates indicating node positions, link numbers identifying the links present between nodes and coordinates indicating the positions of interpolation points each dividing a link into shorter segments are stored. These positional coordinates are used as contour data in map display processing and locator processing.

Information indicating the local time corresponding to each mesh area and information indicating a daylight saving time observation period in each mesh area are stored together with the roadmap data in the auxiliary storage device 140. Statistical traffic information is also managed in correspondence to individual mesh codes at the auxiliary storage device 140. The statistical traffic information is to be described in detail in reference to FIG. 2 later. The display module 150 brings up a screen display of image data containing text and graphics, which are output from the CPU 110.

Figure 2:
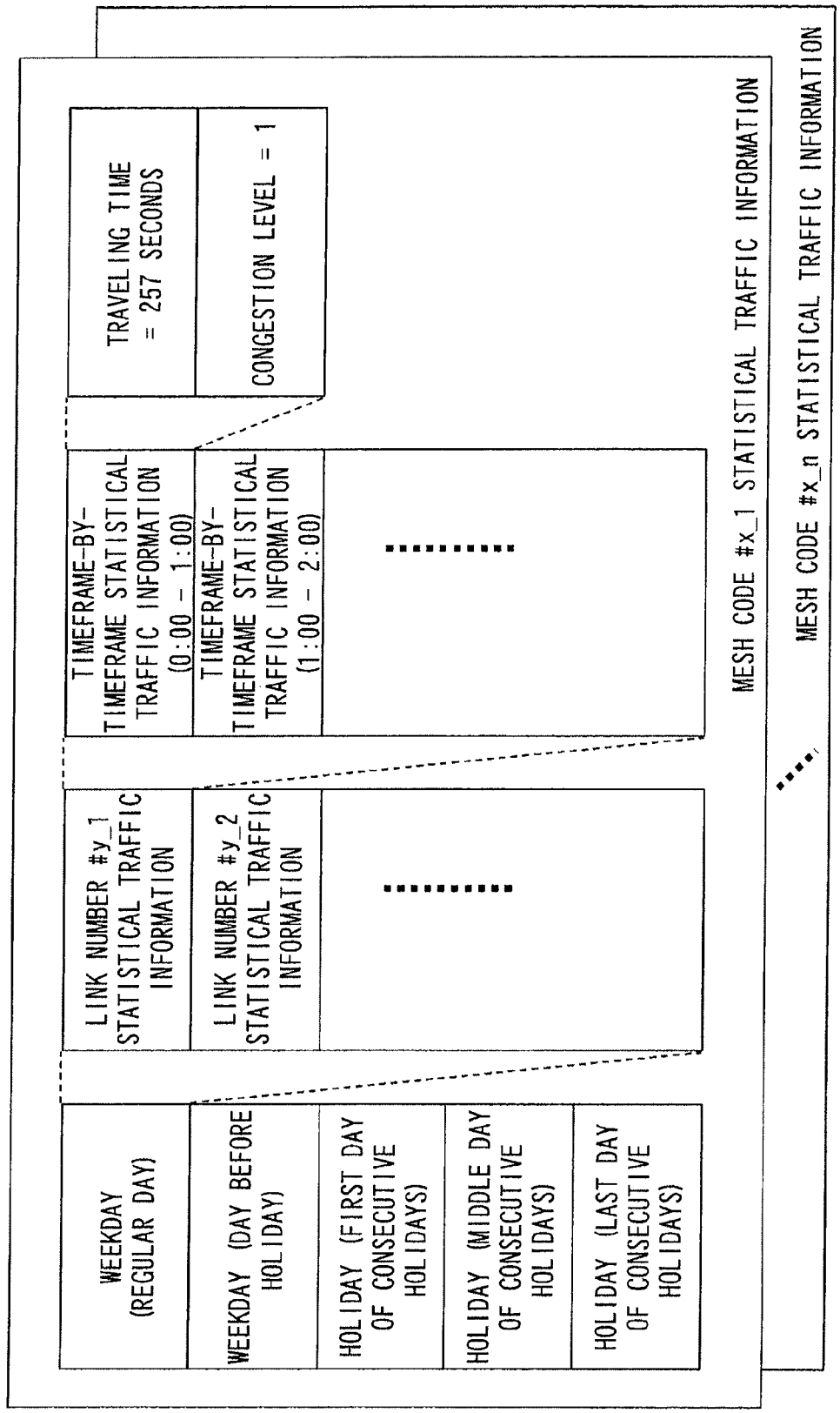
FIG. 2 illustrates how statistical traffic information stored in the auxiliary storage device may be managed.

FIG. 2 illustrates how the statistical traffic information stored in the auxiliary storage device 140 may be managed. As explained earlier, the statistical traffic information is managed in units of individual mesh codes. The statistical traffic information corresponding to mesh code #x__1 assumes a hierarchically layered structure and is stored in correspondence to primary day categories indicating specific day types. There may be five different day categories; "weekday (regular day), weekday (day before holiday)", "holiday (first day of consecutive holidays)", "holiday (middle day of consecutive holidays)" and "holiday (last day of consecutive holidays)". Since the characteristics of traffic conditions vary with the day categories, the statistical traffic information is managed in correspondence to the individual day categories.

In the next hierarchical layer after the day category layer, statistical information is stored in correspondence to each of the link numbers indicating the links contained in the mesh area represented by mesh code #x__1. For instance, the statistical traffic information stored in correspondence to link number #y__1 is organized in correspondence to different time frames in the subsequent hierarchical layer. The statistical traffic information for a time frame 0:00 through 1:00, among the time frames, indicates a traveling time of 257 seconds and congestion level 1 in the example presented in FIG. 2. This means that the length of time required to travel through the link represented by link number #y__1 in the mesh area assigned with mesh code #x__1 is estimated to be 257 seconds in the time frame between 0:00 a.m. and 1:00 a.m. and that the conditions of traffic congestion experienced by the vehicle are likely to be level 1.

Next, the route search processing executed by using statistical traffic information in the navigation system 100 in the embodiment is described in detail. The processing executed by using timeframe-by-timeframe statistical traffic information, such as that shown in FIG. 2, managed in correspondence to different time frames based upon a global standard time (Universal Time) and the processing executed by using timeframe-by-timeframe statistical traffic information based upon local standard time are individually explained in reference to FIGS. 3 through 6. FIG. 6 presents an example of a route from a start point S to a destination G that may be determined through a search. Mesh areas M10 and M20 are adjacent to each other. The searched route is made up with links L11, L12 and L21. While the links L11 and L12 are present in the mesh area M10, the link L21 is present in the mesh area M20. The link L11 connects the start point S to a waypoint, the link L12 connects the waypoint to a waypoint and the link L21 connects the waypoint to the destination G.

(1) Route Search Execution Processing with Timeframe-by-Timeframe Statistical Traffic Information Based Upon Universal Time.

The navigation system 100 determines the date/time of departure and a specific day of the week on which the date falls (hereafter "the date/time and a specific day of the week" is to be referred to as a "time point and the like") by engaging the clock function of the CPU 110 at which the local standard time is set, and then converts the time point and the like to time point and the like in Universal Time. Next, the lengths of traveling time likely to be required to travel through the links L11, L12 and L21 in Universal Time are read out from the timeframe-by-timeframe statistical traffic information managed as shown in FIG. 2. The lengths of link traveling time are added to the departure time point and the like in order to calculate an estimated time of arrival at the destination in Universal Time, the estimated time of arrival and the like thus calculated are then converted to an estimated time of arrival and the like in local standard time matching the setting at the clock function in the CPU 110 and the estimated time of arrival and the like in local standard time are brought up on display at the panel in the display module 150.

It is to be noted that if the mesh areas M10 and M20 are located in different time zones, the estimated time of arrival will be converted to an estimated time of arrival at the destination in the local standard time in the time zone of the destination and the estimated time of arrival resulting from the conversion will be brought up on display at the panel in the display module 150. When the vehicle travels through areas located in different time zones, as described above, the processing must be executed by taking into consideration whether or not daylight saving time is applicable in each area. The time difference between the local time at the start point and the local time at the destination may also be indicated to the user in the form of a message brought up in a screen display or a voice message.

(2) Route Search Execution Processing with Timeframe-by-Timeframe Statistical Traffic Information Managed in Correspondence to Different Time Frames Based Upon the Local Standard Time.

The navigation system 100 determines the departure time point and the like by engaging the clock function of the CPU 110 at which the local standard time is set. Next, the lengths of traveling time likely to be required to travel through the links L11, L12 and L21 in local standard time are read out from the timeframe-by-timeframe statistical traffic information managed as shown in FIG. 2. The lengths of link traveling time are added to the departure time point and the like so as to calculate an estimated time of arrival at the destination and the like, which are then brought up on display at the panel in the display module 150.

It is to be noted that if the mesh areas M10 and M20 are located in different time zones, the lengths of traveling time likely to be required to travel through the links present in the mesh area M10 will be read out and then a time point at which the subject vehicle is likely to travel through the border between the mesh areas will be determined by adding the sum of the lengths of link traveling time likely to be required to travel through the links present within the mesh area M10 to the departure time point and the like. When the vehicle travels through areas located in different time zones, as described above, the processing must be executed by taking into consideration whether or not daylight saving time is applicable in each area. The time point at which the subject vehicle is expected to travel through the border between the mesh areas, initially determined in local time in the time zone of the mesh area M10, will be converted to a time point in the local standard time in the time zone of the mesh area M20, through which the subject vehicle having driven through the border is to travel, is located. An estimated time of arrival at the destination in the local standard time in the time zone of the mesh area M20, obtained by reading out the lengths of traveling time likely to be required to travel through the links in the mesh area M20 and adding the sum of the link traveling time lengths to the time point at which the subject vehicle is expected to cross the border in the local standard time in the time zone of the mesh area M20, will then be brought up on display at the panel in the display module 150. The time difference between the local time at the start point and the local time at the destination may also be indicated to the user in the form of a message brought up in a screen display or a voice message.

Figure 3:
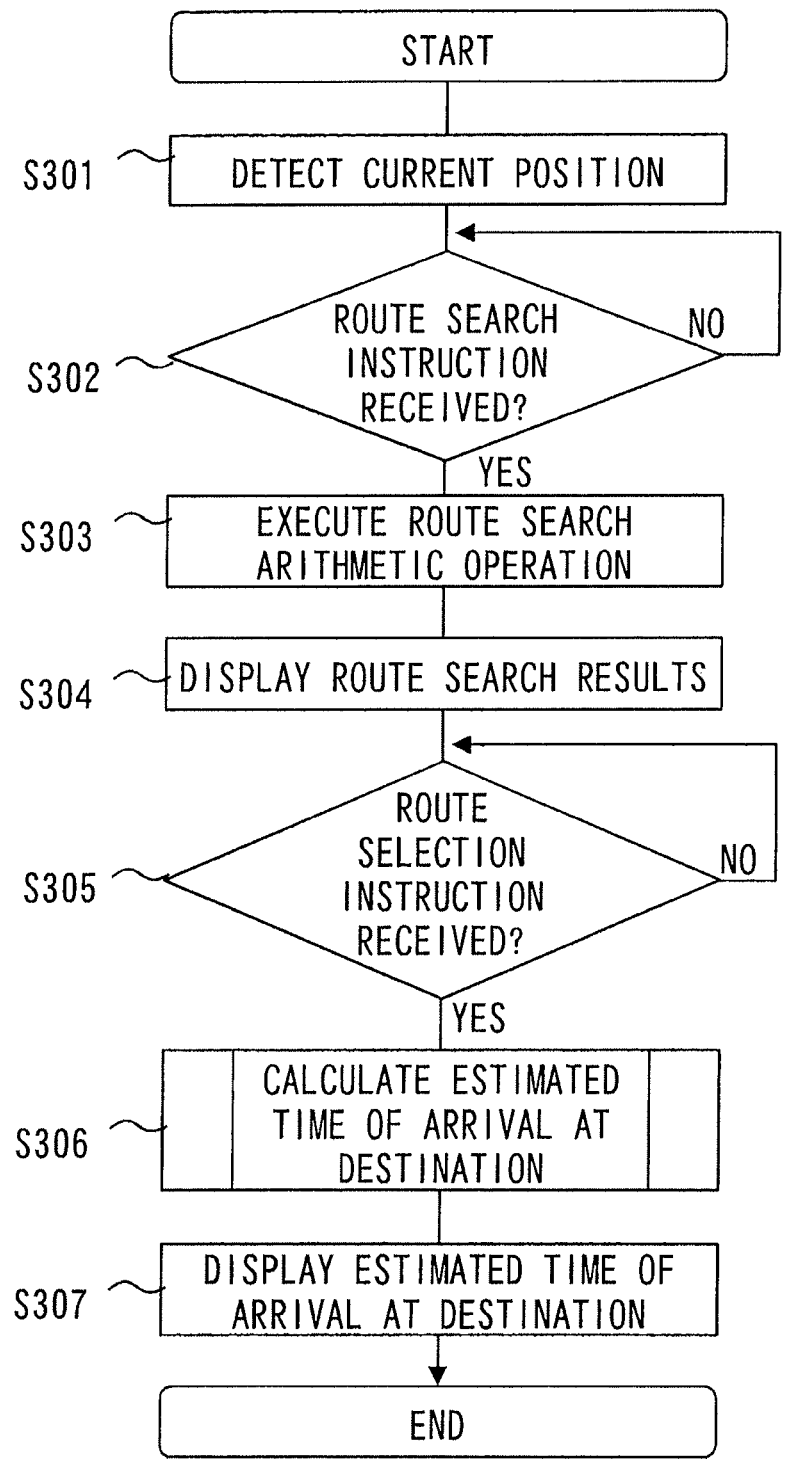
FIG. 3 presents a flowchart of the processing executed when calculating and displaying an estimated time of arrival at the destination via a selected route.

FIG. 3 presents a flowchart of the route search arithmetic operation processing and the processing for calculating and displaying an estimated time of arrival at the destination through the selected route, executed by the CPU 110 in the navigation system 100.

In step S301, the current position of the vehicle equipped with the navigation system 100 is detected via the current position detection device 120. In step S302, a decision is made as to whether or not instructions for setting a destination and executing route search arithmetic operation, issued by the user via the user input device 130, have been received. Until these execution instructions are received, step S302 is repeatedly executed in this processing procedure. Once the execution instructions have been received, the route search arithmetic operation is executed in step S303. In step S304, route search results are brought up on display at the display panel of the display module 150. In step S305, a decision is made as to whether or not an instruction for executing route selection, issued by the user via the user input device 130, has been received. Until this execution instruction is received, step S305 is repeatedly executed in this processing procedure. Once the execution instruction has been received, an estimated destination arrival time calculation subroutine, to be detailed later, is executed in step S306. The estimated time of arrival at the destination, resulting from the subroutine, is brought up on display at the display panel of the display module 150 in step S307, and then the processing procedure ends.

Figure 4:
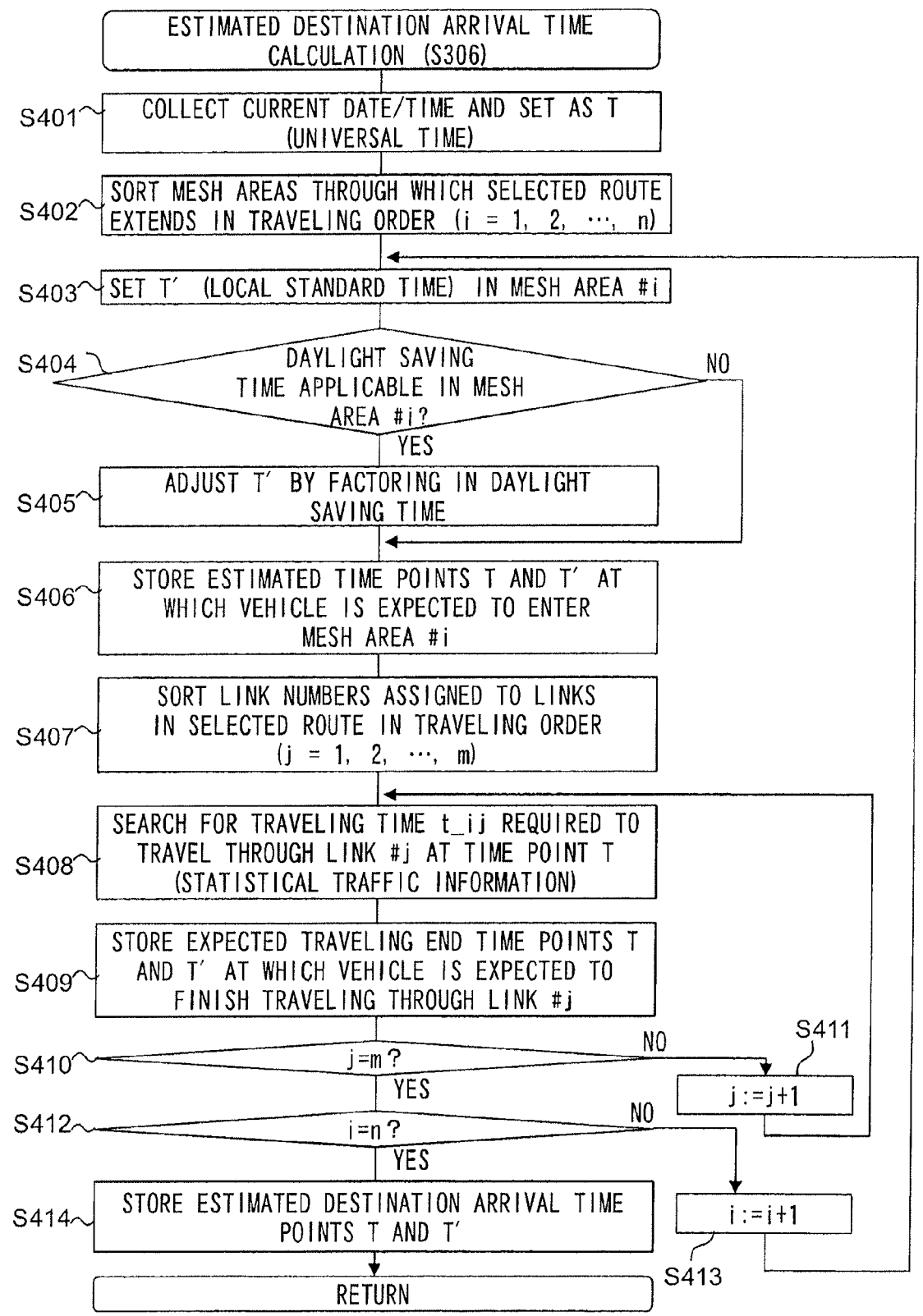
FIG. 4 presents a flowchart of processing executed when calculating an estimated time of arrival at the destination based upon a global standard time (Universal Time).
Figure 5:
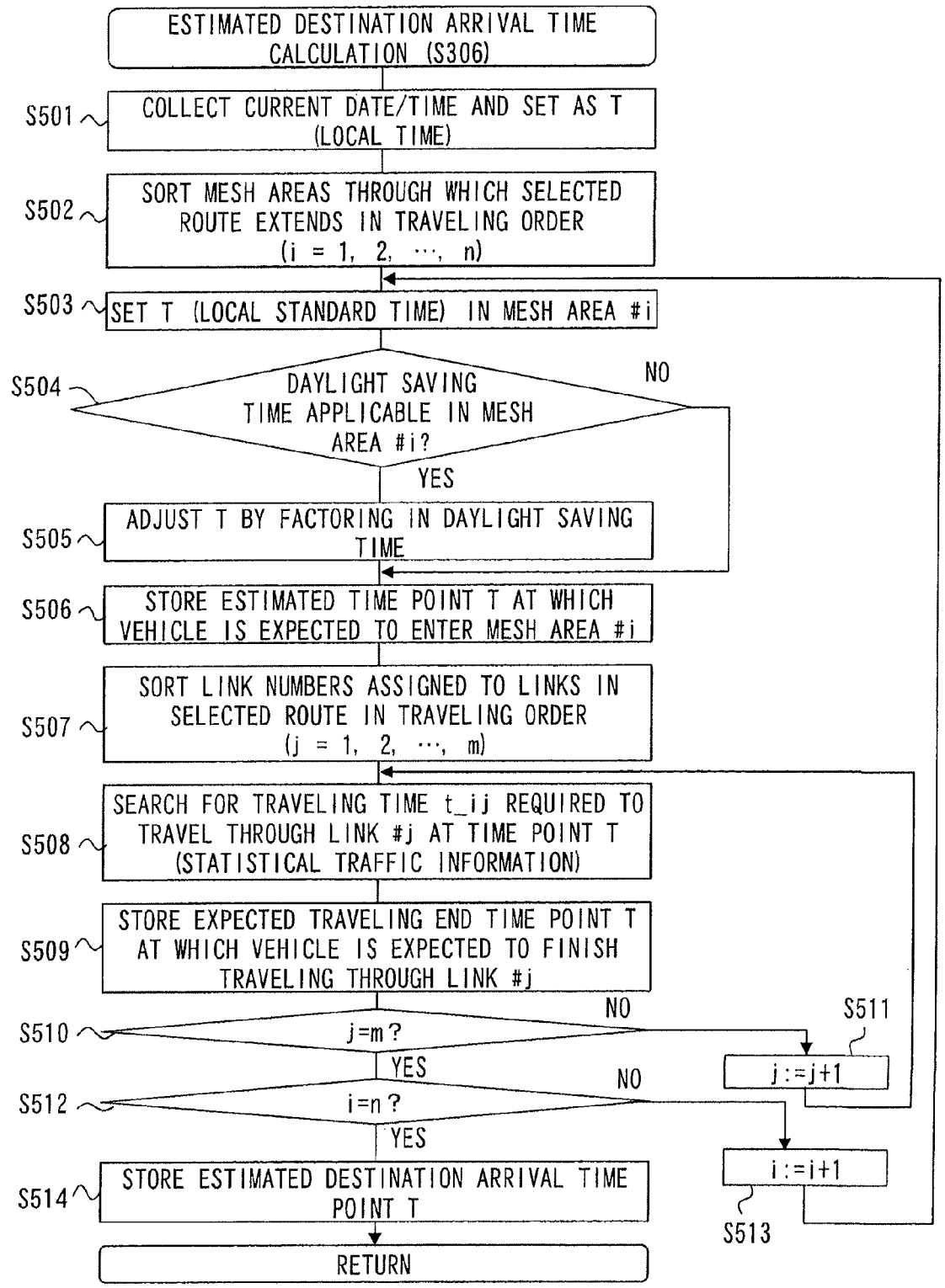
FIG. 5 presents a flowchart of the processing executed when calculating an estimated time of arrival at the destination based upon local standard time.
Figure 6:
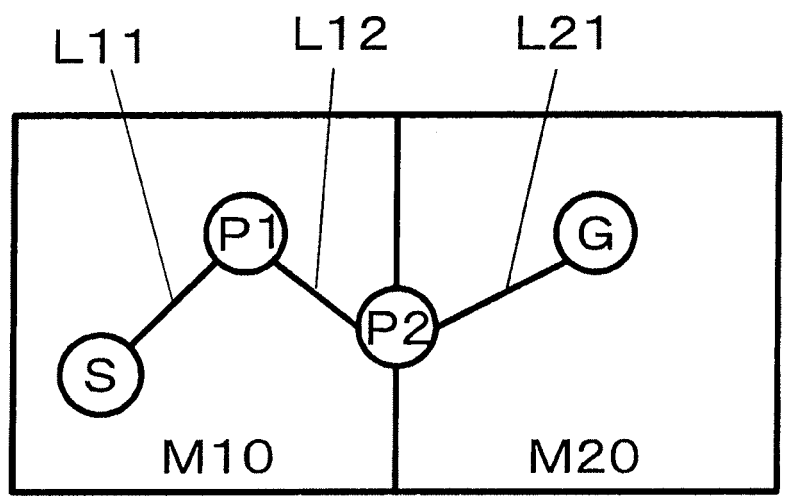
FIG. 6 illustrates a route from a start point to a destination that may be determined through a search.

FIGS. 4 and 5 each present a flowchart of the estimated destination arrival time calculation subroutine mentioned above. As explained earlier, the timeframe-by-timeframe statistical traffic information in FIG. 2 may be managed based upon Universal Time or based upon the local standard time. The estimated destination arrival time calculation processing procedure executed based upon timeframe-by-timeframe statistical traffic information managed based upon Universal Time is described in reference to FIG. 4. The estimated destination arrival time calculation processing procedure executed based upon timeframe-by-timeframe statistical traffic information managed based upon local standard time is described in reference to FIG. 5.

FIG. 4 shows the procedure for the estimated destination arrival time calculation processing subroutine executed based upon Universal Time in step S306 in FIG. 3. In step S401, the current date/time, ascertained via the clock function of the CPU 110, is converted to a time point T based upon Universal Time. In step S402, n mesh areas through which the selected route extends are sorted in the order in which the subject vehicle, traveling from the start point toward the destination, passes through the individual mesh areas (i=1, 2, . . . n). Subsequently, the sequence of processing from step S403 through step S412 and step S413 is repeatedly executed for all the mesh areas i=1 through n.

In step S403, a time point T' in local standard time of the time zone of the mesh area #i is set based upon latitude/longitude information by referencing the local standard time information stored in the auxiliary storage device 140. In step S404, a decision is made as to whether or not daylight saving time is applicable in the mesh area #i by referencing daylight saving time information stored in the auxiliary storage device 140. If an affirmative decision is made, the time point T' is adjusted by factoring in daylight saving time in step S405 before the processing proceeds to step S406. If, on the other hand, a negative decision is made, the processing directly proceeds to step S406.

In step S406, the estimated time points T and T' at which the subject vehicle is expected to enter the mesh area #i are stored into the main storage device 115 or the auxiliary storage device 140. In step S407, the link numbers assigned to the links constituting the selected route are sorted in the order in which the corresponding links are to be traveled (j=1, 2, . . . m). Subsequently, the sequence of processing from step S408 through step S410 and step S411 is repeatedly executed for all the links j=1 through m.

In step S408, the length of traveling time t_ij likely to be required to travel through the link #j at the time point T is searched by referencing the statistical traffic information stored in correspondence to the individual mesh codes in the auxiliary storage device 140. In step S409, estimated time points T and T' at which the vehicle is expected to finish traveling through the link #j, determined based upon the traveling time t_ij for the link #j, are stored into the main storage device 115 or the auxiliary storage device 140.

In step S410, a decision is made as to whether or not j is equal to m ("j=m?") so as to determine whether or not expected travel end time points T and T' have been calculated for all the links present in the mesh area #i. If a negative decision is made, j is incremented to j+1 in step S411 and the processing returns to step S408. However, if an affirmative decision is made, the processing proceeds to step S412.

In step S412, a decision is made as to whether or not i is equal to n ("i=n?") so as to determine whether or not expected travel end time points T and T' have been calculated for all the mesh areas through which the selected route extends. If a negative decision is made, i is incremented to i+1 in step S413 and the processing returns to step S403. However, if an affirmative decision is made, the processing proceeds to step S414. Once the estimated destination arrival time points T and T' have been stored in step S414, the subroutine ends and the processing returns to the main routine in FIG. 3.

FIG. 5 shows the procedure for the estimated destination arrival time calculation processing subroutine executed based upon the local standard time in step S306 in FIG. 3. In step S501, the current date/time, ascertained via the clock function of the CPU 110, is set as a time point T in local standard time. In step S502, n mesh areas through which the selected route extends are sorted in the order in which the subject vehicle, traveling from the start point toward the destination, passes through the individual mesh areas (i=1, 2, . . . , n). Subsequently, the sequence of processing from step S503 through step S512 and step S513 is repeatedly executed for all the mesh areas i=1 through n.

In step S503, a time point T in local standard time of the time zone of the mesh area #i is set based upon latitude/longitude information by referencing the local standard time information stored in the auxiliary storage device 140. In step S504, a decision is made as to whether or not daylight saving time is applicable in the mesh area #i by referencing daylight saving time information stored in the auxiliary storage device 140. If an affirmative decision is made, the time point T is adjusted by factoring in daylight saving time in step S505 before the processing proceeds to step S506. If, on the other hand, a negative decision is made, the processing directly proceeds to step S506.

In step S506, an estimated time point T at which the subject vehicle is expected to enter the mesh area #i is stored into the main storage device 115 or the auxiliary storage device 140. In step S507, the link numbers assigned to the links constituting the selected route are sorted in the order in which the corresponding links are to be traveled (j=1, 2, . . . , m). Subsequently, the sequence of processing from step S508 through step S510 and step S511 is repeatedly executed for all the links j=1 through m.

In step S508, the length of traveling time t_ij likely to be required to travel through the link #j at the time point T is searched by referencing the statistical traffic information stored in correspondence to the individual mesh codes in the auxiliary storage device 140. In step S509, an estimated time point T at which the vehicle is expected to finish traveling through the link #j, determined based upon the traveling time t_ij for the link #j, is stored into the main storage device 115 or the auxiliary storage device 140.

In step S510, a decision is made as to whether or not j is equal to m ("j=m?") so as to determine whether or not expected travel end time points T have been calculated for all the links present in the mesh area #i. If a negative decision is made, j is incremented to j+1 in step S511 and the processing returns to step S508. However, if an affirmative decision is made, the processing proceeds to step S512.

In step S512, a decision is made as to whether or not i is equal to n ("i=n?") so as to determine whether or not expected travel end time points T have been calculated for all the mesh areas through which the selected route extends. If a negative decision is made, i is incremented to i+1 in step S513 and the processing returns to step S503. However, if an affirmative decision is made, the processing proceeds to step S514. Once the estimated destination arrival time point T has been stored in step S514, the subroutine ends and the processing returns to the main routine in FIG. 3.

The navigation system 100 achieved in the first embodiment described above is structured so that information indicating the local standard time in each mesh area and information indicating the period of time during which daylight saving time is applicable in each mesh area are stored in advance together with roadmap data. As a result, an advantage is achieved in that even when the subject vehicle is to travel through different time zones, a route search can be reliably executed by using statistical traffic information.

-Variations of the First Embodiment-

The navigation system 100 achieved in the first embodiment as described above allows for the following variations.

(1) While the local standard time and the daylight saving schedule are ascertained in correspondence to each mesh area in the processing shown in FIGS. 4 and 5, these factors may be considered in correspondence to each link or each local region instead.

(2) The procedure for the estimated destination arrival time calculation processing executed with timeframe-by-timeframe statistical traffic information, such as that shown in FIG. 2, managed based upon Universal Time and the procedure of the estimated destination arrival time calculation processing executed with timeframe-by-timeframe statistical traffic information managed based upon the local standard time have been described in reference to FIGS. 4 and 5 respectively. The operation in the navigation system may be executed by switching over from one of the two types of estimated destination arrival time calculation processing described above to the other. Such a switchover may be triggered by, for instance, a flag value indicating whether the timeframe-by-timeframe statistical traffic information is currently managed based upon Universal Time or local standard time or triggered in response to a user input operation.

(3) While the estimated destination arrival time calculation processing procedure is executed to determine an estimated time of arrival at the destination through a route selected based upon the results of a search before the vehicle equipped with the navigation system 100 departs the start point in the processing shown in FIG. 3, the estimated destination arrival time calculation processing procedure may also be executed with a given timing after departing the start point so as to indicate the estimated time of arrival at the destination with an even higher level of accuracy.

Figure 7:
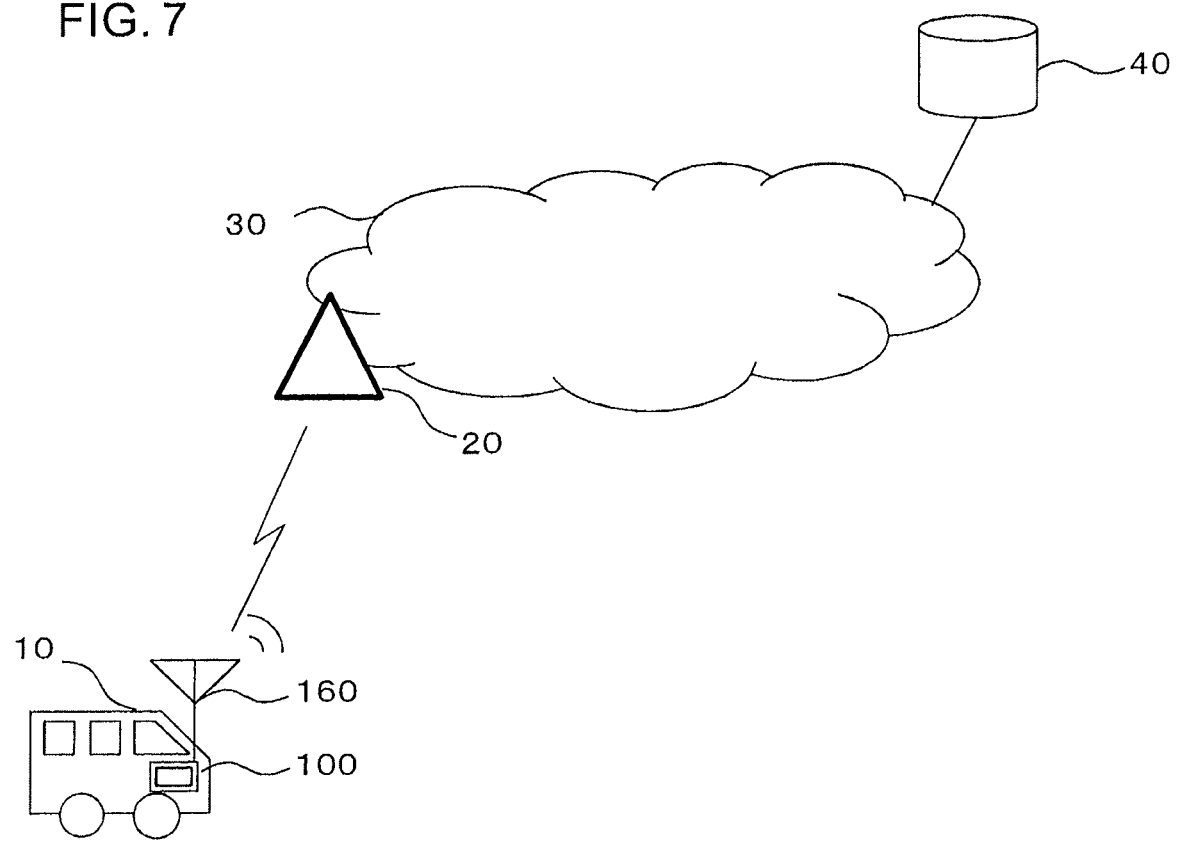
FIG. 7 shows the overall configuration of the estimated destination arrival time calculation system.

(4) In the processing described in reference to FIG. 3, the estimated destination arrival time calculation processing is executed by using statistical traffic information stored in the navigation system 100. As an alternative, the navigation system 100 installed in a vehicle 10 may further include a communication module 160, statistical traffic information may be stored in a server 40 connected to a communication network 30, and the navigation system 100 may download an estimated time of arrival at the destination calculated through estimated destination arrival time calculation processing executed at the server 40, via the communication network 30 and an access point 20, as illustrated in FIG. 7.

Figure 8:
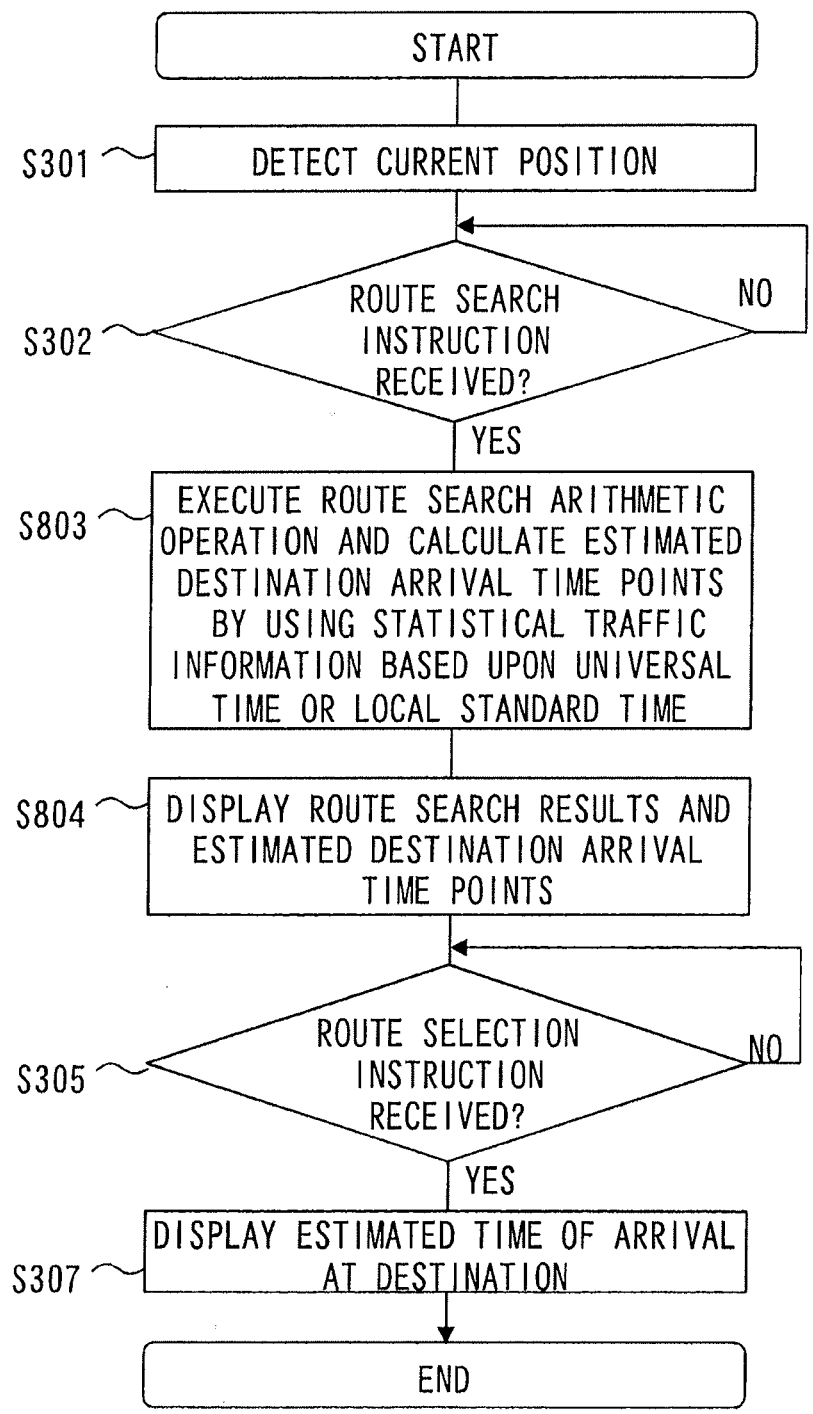
FIG. 8 presents a flowchart of processing executed when calculating and displaying the estimated time of arrival at the destination by executing route search operation in conjunction with statistical traffic information based upon Universal Time or local standard time.

(5) In the processing described in reference to FIG. 3, the navigation system 100 executes route search arithmetic operation in step S303 to determine a route from the current position to the destination. Then, in step S306 the navigation system calculates an estimated time of arrival at the destination for the route selected in step S305. However, the processing may be executed by adopting an alternative method such as that shown in FIG. 8. FIG. 8 presents a flowchart of the processing for executing route search arithmetic operation with statistical traffic information based upon Universal Time or the local standard time and calculating and displaying an estimated time of arrival at the destination. The processing in this figure differs from that in FIG. 3 in that processing steps S803 and S804 are executed in place of processing steps S303, S304 and S307 in FIG. 3. Provided that the timeframe-by-timeframe statistical traffic information is managed and stored based upon Universal Time, the current time point in local standard time in the time zone of the start point is first converted to a current time point indicated in Universal Time and then an arithmetic operation is executed to search for routes between the current position and the destination by using the timeframe-by-timeframe statistical traffic information corresponding to the current time point resulting from the conversion in step S803. If, on the other hand, the timeframe-by-timeframe statistical traffic information is managed and stored based upon local standard time, an arithmetic operation is executed to search for routes between the current position and the destination by using corresponding timeframe-by-timeframe statistical traffic information based upon the local standard time in each of the mesh areas present between the current position and the destination. As a result, in addition to various routes extending between the current position and the destination, estimated time points of arrival at the destination through those routes can be determined. Accordingly, in step S804, the estimated time points of arrival at the destination in local standard time in the time zone of the destination are displayed, together with the route search results, at the display panel of the display module 150. It is preferable that upon receiving in step S305 an instruction issued by the user for executing route selection, the processing proceed to step S307 to display the estimated time of arrival at the destination through the selected route at the display panel of the display module 150 before ending the estimated destination arrival time calculation processing procedure.

(6) While the present invention is adopted in the navigation system 100 in the first embodiment and the variations thereof described above, the present invention is not limited to this example and it may be adopted in a PND (personal navigation device), a PDA (personal digital assistant), a mobile telephone, a portable personal computer or a portable game machine.

-Second Embodiment-

In reference to FIGS. 1 through 3, 6, 9A, 9B and 10, the second embodiment achieved by installing the navigation system according to the present invention in a vehicle is described.

While the navigation system 100 in the embodiment assumes a structure identical to that of the navigation system in the first embodiment, already described in reference to FIG. 1, calendar data and day category registration tables each correlating calendar dates with day categories are also stored in the auxiliary storage device 140 in addition to the statistical traffic information shown in FIG. 2. The day category registration tables, to be described in detail later in reference to FIGS. 9A and 9B, are each created in correspondence to a specific region based upon the calendar data pertaining to the particular region.

FIGS. 9A and 9B each present an example of a date category registration table that may be stored in the auxiliary storage device 140. As described earlier, calendar dates are correlated to specific day categories in a day category registration table. The table in FIG. 9A indicates day categories designated to the five days starting on August 28 (Thursday) 2008, when September 1 (Monday), 2008 is a holiday. To be more specific, August 28 (Thursday) 2008, is categorized as "weekday (regular day)", the 29th (Friday) is categorized as "weekday (day before holiday)", the 30th (Saturday) is categorized as "holiday (first day of consecutive holidays)", the 31st (Sunday) is categorized as "holiday (middle day of consecutive holidays)" and September the 1st (Monday), 2008 is categorized as "holiday (last day of consecutive holidays)".

In a given region in, for instance, the United States of America, holidays set forth by the state government are observed in addition to holidays set forth by the national government. For this reason, while the date category registration table for state A may indicate the day category designations in FIG. 9A, the day category registration table for state B adjacent to state A may indicate August 28 (Thursday) 2008 categorized as "weekday (day before holiday)", the 29th (Friday) categorized as "holiday (first day of consecutive holidays)", and the 30th (Saturday) categorized as "holiday (middle day of consecutive holidays)" as shown in FIG. 9B.

The route search execution processing executed in the navigation system 100 by using statistical traffic information in the embodiment is now described in detail. It is assumed that the mesh area M10 in FIG. 6 is located in state A. Accordingly, statistical traffic information is used by referencing the day category registration table in FIG. 9A. Since the mesh area M20 is located in state B, statistical traffic information is used by referencing the day category registration table in FIG. 9B.

As the subject vehicle departs the start point S on, for instance, August 29 (Friday), 2008, the latitudes/longitudes of the start point S, the destination G and the like are determined based upon input signals provided from the current position detection device 120. Thus, the navigation system 100 is able to locate the start point S in the mesh area M10, i.e., state A, by referencing the roadmap data stored in the auxiliary storage device 140. It is likewise able to locate the destination G in the mesh area M20, i.e., state B. As FIGS. 9A and 9B indicate, August 29 (Friday), 2008, which falls on a weekday (day before holiday) in state A where the start point S is located, is designated as a holiday (first day of consecutive holidays) in state B where the destination G is located.

The link traveling time lengths for the links L11, L12 and L21 are read out from the timeframe-by-timeframe statistical traffic information shown in FIG. 2, in correspondence to the specific day categories having been determined as described above. While the link traveling time lengths for the links L11 and L12 correspond to a weekday (day before holiday), the link traveling time length for the link L21 corresponds to a holiday (first day of consecutive holidays). The estimated time of arrival at the destination G is calculated by adding the sum of the link traveling time lengths to the departure time point and the calculated estimated time of arrival is brought up on display at the panel of the display module 150.

The CPU 110 of the navigation system 100 executes the route search arithmetic operation processing and the processing for calculating and displaying an estimated time of arrival at the destination through the selected route by following the procedural steps having already been described in reference to the flowchart presented in FIG. 3.

Figure 10:
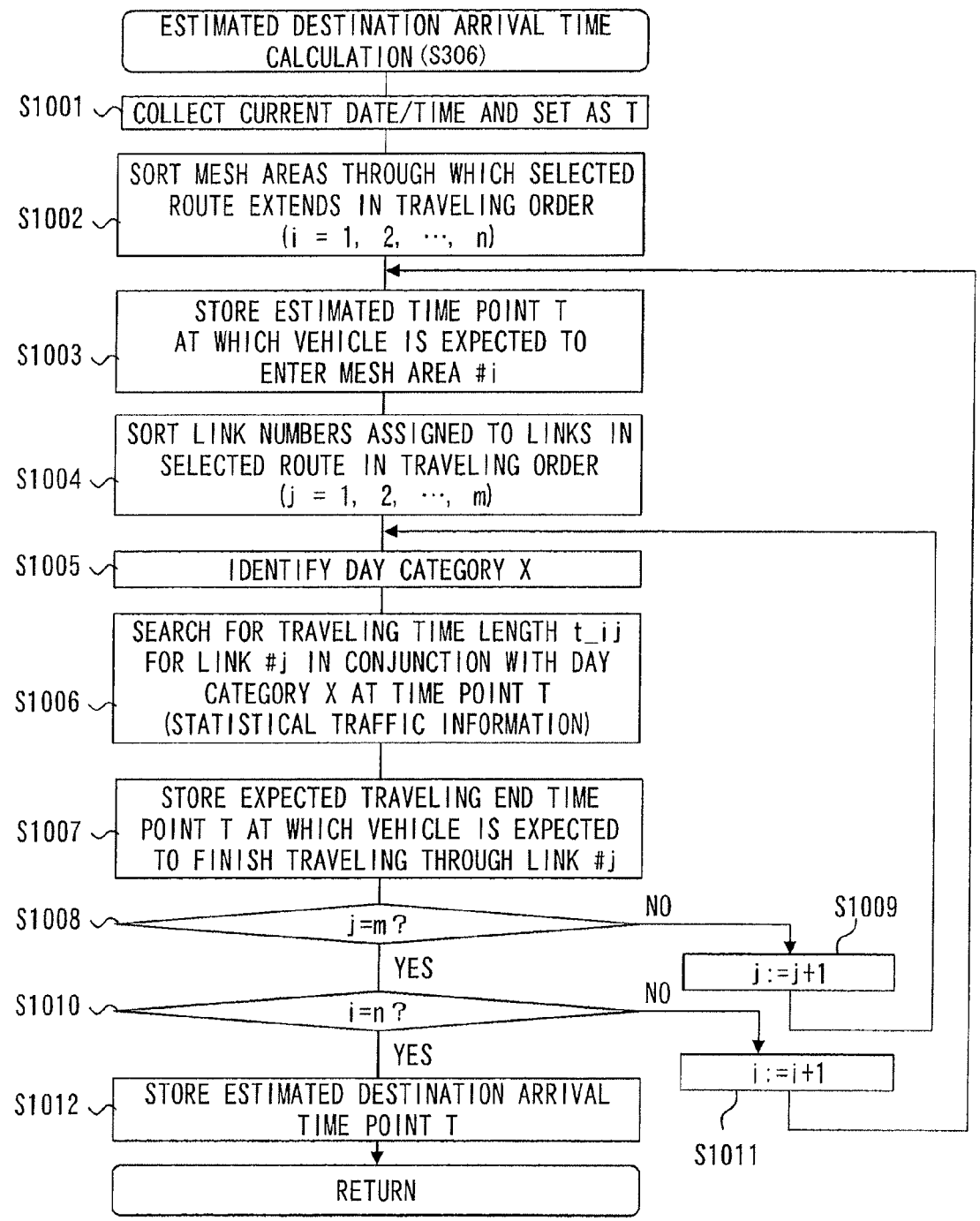
FIG. 10 presents a flowchart of the processing executed when calculating an estimated time of arrival at the destination.

FIG. 10 presents a flowchart of the estimated destination arrival time calculation processing subroutine executed in step S306 in FIG. 5. In step S1001, the current date/time, ascertained via the clock function of the CPU 110, is set as a time point T. In step S1002, n mesh areas through which the selected route extends are sorted in the order in which the subject vehicle, traveling from the start point toward the destination, passes through the individual mesh areas (i=1, 2, . . . , n). Subsequently, the sequence of processing from step S1003 through step S1010 and step S1011 is repeatedly executed for all the mesh areas i=1 through n.

In step S1003, an estimated time point T at which the subject vehicle is expected to enter the mesh area #i is stored into the main storage device 115 or the auxiliary storage device 140. In step S1004, the link numbers assigned to the links constituting the selected route are sorted in the order in which the corresponding links are to be traveled (j=1, 2, . . . , m). Subsequently, the sequence of processing from step S1005 through step S1008 and step S1009 is repeatedly executed for all the links j=1 through m.

In step S1005, the region where the link #j in the mesh area #i is located, is identified based upon the roadmap data stored in the auxiliary storage device 140 and a specific day category X designated to the current date/time is identified by referencing the day category registration table corresponding to the particular region. In step S1006, the length of traveling time t_ij likely to be required to travel through the link #j at the time point T on the day categorized as X is searched by referencing the statistical traffic information stored in correspondence to the individual mesh codes in the auxiliary storage device 140. In step S1007, an estimated time point T at which the vehicle is expected to finish traveling through the link #j, determined based upon the traveling time t_ij for the link #j, is stored into the main storage device 115 or the auxiliary storage device 140.

In step S1008, a decision is made as to whether or not j is equal to m ("j=m?") so as to determine whether or not expected travel end time points T have been calculated for all the links present in the mesh area #i. If a negative decision is made, j is incremented to j+1 in step S1009 and the processing returns to step S1005. However, if an affirmative decision is made, the processing proceeds to step S1010.

In step S1010, a decision is made as to whether or not i is equal to n ("i=n?") so as to determine whether or not expected travel end time points T have been calculated for all the mesh areas through which the selected route extends. If a negative decision is made, i is incremented to i+1 in step S1011 and the processing returns to step S1003. However, if an affirmative decision is made, the processing proceeds to step S1012. Once the estimated destination arrival time point T has been stored in step S1012, the subroutine ends and the processing returns to the main routine in FIG. 3.

The navigation system 100 achieved in the second embodiment as described by is structured so that day category registration tables prepared in correspondence to individual regions are stored in advance in the auxiliary storage device 140. Thus, statistical traffic information corresponding to a specific day category determined by referencing a day category registration table selected in correspondence to the region where the selected route determined based upon search results is located, can be extracted. As a result, even when the subject vehicle travels through a route crossing over from one region to another where different holidays are observed, the navigation system 100 is able to calculate an accurate estimated time of arrival at the destination by executing a route search with optimal statistical traffic information.

-Variations of the Second Embodiment-

The navigation system 100 achieved in the second embodiment as described above allows for the following variations.

(1) While the navigation system 100 in the second embodiment described above detects the current position via the current position detection device 120 and automatically selects the day category registration table corresponding to the region where the detected current position is located, a day category registration table may be manually selected and set when executing the route search arithmetic operation, instead. For instance, the user may issue an instruction for the CPU 110 for setting a day category registration table via the user input device 130 and the CPU 110, in response to the instruction, may bring up on display a calendar at the panel of the display module 150. In this case, as the user specifies a target calendar day, selects a corresponding day category and confirms the selection, a day category registration table will be set and selected. If, on the other hand, a day category registration table can be selected exclusively from the day category registration tables stored in advance in the auxiliary storage device 140, the user may enter the name of the region in which the route is located and the CPU 110 may select the specific day category registration table corresponding to the entered region name by reading it out from the auxiliary storage device 140. Day category registration tables each corresponding to a plurality of regions sharing a given holiday calendar may be classified as a type 1 table, a type 2 table, . . . and the like and, in such a case, the user may select a day category registration table by specifying the type number assigned to the particular day category registration table instead of entering the name of the region.

(2) The navigation system 100 in the second embodiment described above determines the day category corresponding to the current date/time by referencing the day category registration table for the region in order to calculate the link traveling time length based upon statistical traffic information retrieved in correspondence to the day category. As an alternative, the day category corresponding to the current date/time may be determined by referencing calendar data available in correspondence to each region.

(3) In the second embodiment described above, day category registration tables for various regions are created based upon calendar data for the individual regions and the day category registration tables are then stored into the auxiliary storage device 140 in advance. As an alternative, the navigation system 100 may further include a communication module and download via the communication module calendar data for various regions from a server connected to a communication network.

Figure 11:
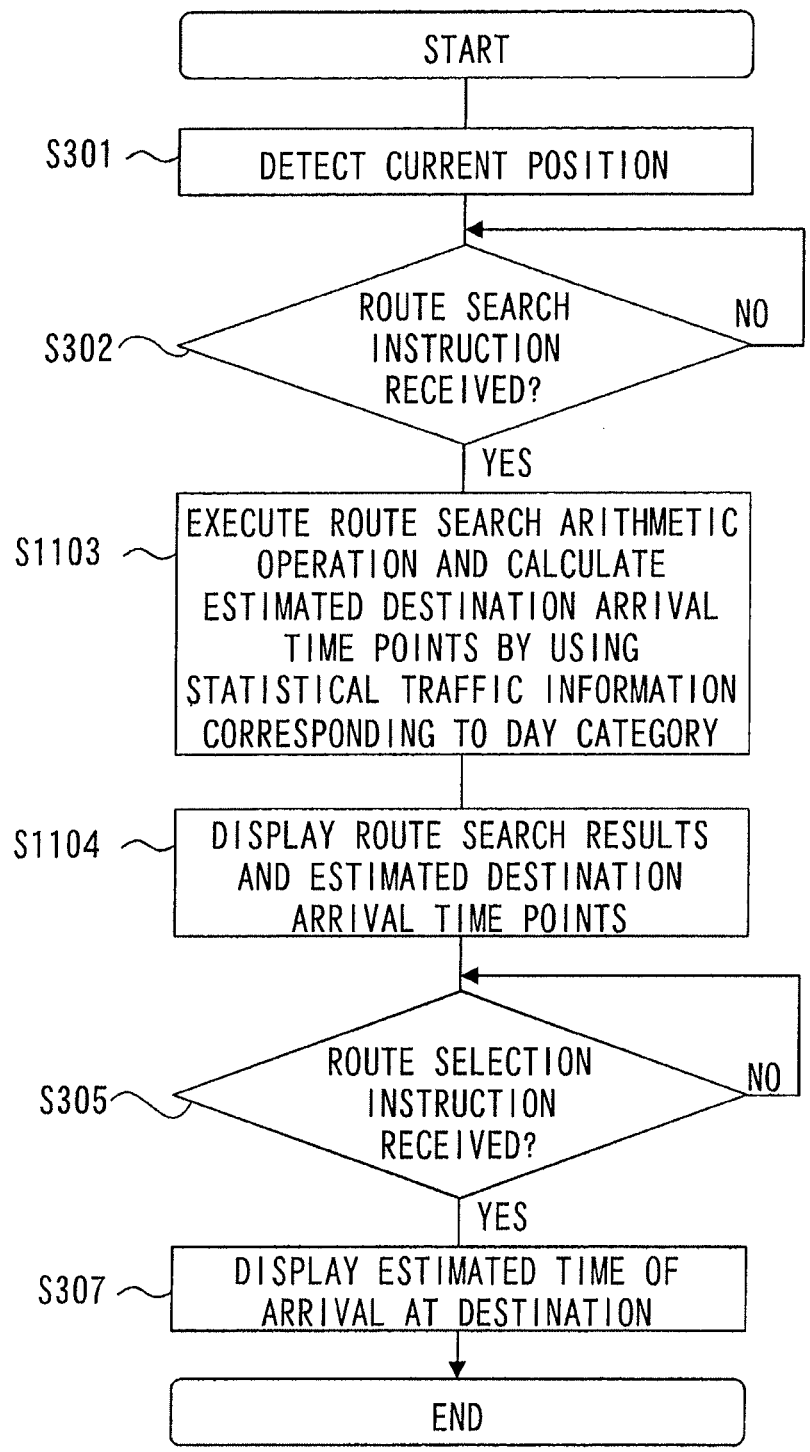
FIG. 11 presents a flowchart of processing executed when calculating and displaying an estimated time of arrival at the destination by executing route search operation in conjunction with statistical traffic information corresponding to a specific day category.

(4) In the processing described in reference to FIG. 3, the navigation system 100 executes route search arithmetic operation in step S303 to search for routes from the current position to the destination and then calculates an estimated time of arrival at the destination in step S306 for the route selected in step S305. However, the processing may be executed by adopting an alternative method such as that shown in FIG. 11. FIG. 11 presents a flowchart of the processing for executing a route search arithmetic operation with statistical traffic information corresponding to a specific day category and calculating and displaying estimated destination arrival time points. The processing in this figure differs from that in FIG. 3 in that processing steps S1103 and S1104 is executed in place of processing steps S303, S304 and S307 in FIG. 3. In step S1103, day category registration tables corresponding to the regions where the mesh areas present between the current position detected via the current position detection device 120 and the destination are located, are selected from the day category registration tables stored in the auxiliary storage device 140, day categories are determined by referencing the selected day category registration tables and route search arithmetic operation is executed to search for routes between the current position and the destination by using timeframe-by-timeframe statistical traffic information corresponding to the day categories. As a result, in addition to various routes extending between the current position and the destination, estimated time points of arrival at the destination through those routes can be determined. Accordingly, in step S1104, the estimated time points of arrival at the destination are displayed, together with the route search results, at the display panel of the display module 150. It is desirable that upon receiving in step S305 an instruction issued by the user for executing route selection, the processing proceed to step S307 to display the estimated time of arrival at the destination through the selected route at the display panel of the display module 150 before ending the estimated destination arrival time calculation processing procedure.

(5) While the present invention is adopted in the navigation system 100 in the second embodiment and the variations thereof described above, the present invention is not limited to this example and it may be adopted in a PND, a PDA, a mobile telephone, a portable personal computer or a portable game console.

The first and second embodiments and the variations thereof described above may be adopted in combination. In addition, as long as functions characterizing the present invention are not compromised, the present invention is in no way limited to any of the devices structured and configured as has been described in reference to the embodiments.

What is claimed is:

1. A navigation system, comprising:
a current position detector that detects a current position of a subject vehicle;
a storage that stores statistical traffic information including a first length of time which is required to travel through a road segment on a first day category and a second length of time which is required to travel through the road segment on a second day category different from the first day category;
a route searcher that searches for a recommended route from a start point to a destination of the subject vehicle; and
an estimated time of arrival calculator that:
for a road segment constituting the recommended route:
if a day category corresponding to a traveling date on which the subject vehicle is expected to travel is the first day category, extracts the first length of time as a length of traveling time which is required to travel through the road segment when the subject vehicle travels through the road segment, and, for another road segment constituting the recommended route, if a day category corresponding to the traveling date on which the subject vehicle is expected to travel is the second day category, extracts the second length of time as a length of traveling time which is required to travel through the another road segment when the subject vehicle travels through the another road segment, and
calculates an estimated time of arrival at which the subject vehicle is expected to arrive at the destination based on a current time point and a sum of lengths of traveling times, each of which is the length of traveling time having been respectively extracted for the road segments constituting the recommended route,
wherein:
the first length of time is based on statistics of past traffic information on the first day category and the second length of time is based on statistics of past traffic information on the second day category; and
the estimated time of arrival calculator identifies the day category on which the subject vehicle is expected to travel for each road segment constituting the recommended route.

2. A navigation system according to claim 1, wherein:
when a road segment not located in a first area in which the start point is located but located in a second area corresponding to a different day category from the first area constitutes the recommended route, the estimated time of arrival calculator calculates a date and a time on which the subject vehicle is expected to start traveling the road segment located in the second area, and, based on the date and the time calculated, the estimated time of arrival calculator identifies the day category corresponding to the road segment located in the second area.

3. A navigation system according to claim 2, wherein:
the estimated time of arrival calculator calculates the estimated time of arrival by assuming a date and a time on which the subject vehicle is expected to end traveling road segments located in the first area as a date and a time on which the subject vehicle is expected to start traveling road segments located in the second area.

4. A navigation system according to claim 1, further comprising:
a display that displays the estimated time of arrival.

5. A navigation system according to claim 2, further comprising:

a display that displays the estimated time of arrival.

6. A navigation system according to claim 3, further comprising:
a display that displays the estimated time of arrival.

7. A navigation system, comprising:
a current position detector that detects a current position of a subject vehicle;
a storage that stores statistical traffic information including a first length of time which is required to travel through a road segment on a first day category and a second length of time which is required to travel through the road segment on a second day category different from the first day category; and
a route searcher that:
for a road segment:
if a day category corresponding to a traveling date on which the subject vehicle is expected to travel is the first day category, extracts the first length of time as a length of traveling time which is required to travel through the road segment when the subject vehicle travels through the road segment, and, for another road segment constituting the recommended route,
if a day category corresponding to the traveling date on which the subject vehicle is expected to travel is the second day category, extracts the second length of time as a length of traveling time which is required to travel through the another road segment when the subject vehicle travels through the another road segment, and
searches for a recommended route from a start point to a destination of the subject vehicle based on a sum of lengths of traveling times, each of which is the length of traveling time having been respectively extracted for the road segments, wherein:
the first length of time is based on statistics of past traffic information on the first day category and the second length of time is based on statistics of past traffic information on the second day category; and
the route searcher identifies the day category on which the subject vehicle is expected to travel for each road segment constituting the recommended route.

8. A navigation system according to claim 7, wherein:
the route searcher calculates a date and a time on which the subject vehicle is expected to start traveling a road segment not located in a first area in which the start point is located but located in a second area corresponding to a different day category from the first area, and, based on the date and the time calculated, the route searcher identifies the day category corresponding to the road segment located in the second area.

9. A navigation system according to claim 7 further comprising:
a display that displays an estimated time of arrival at which the subject vehicle is expected to arrive at the destination.

10. A navigation system according to claim 8, further comprising:
a display that displays an estimated time of arrival at which the subject vehicle is expected to arrive at the destination.

11. A route search method, comprising:
detecting, by a current position detector, a current position of a subject vehicle;
searching, by a route searcher, for a recommended route from a start point to a destination of the subject vehicle;
identifying, by an estimated time of arrival calculator, a day category on which the subject vehicle is expected to travel, for each road segment constituting the recommended route;
for a road segment constituting the recommended route:
extracting, by the estimated time of arrival calculator, by referencing statistical traffic information in a storage, a first length of time which is required to travel through the road segment on a first day category based on statistics of past traffic information on the first day category as a length of traveling time which is required to travel through the road segment when the subject vehicle travels through the road segment if a day category corresponding to a traveling date on which the subject vehicle is expected to travel is the first day category, and, for another road segment constituting the recommended route,
extracting, by the estimated time of arrival calculator, by referencing the statistical traffic information in the storage, a second length of time which is required to travel through the another road segment on a second day category based on statistics of past traffic information on the second day category as a length of traveling time which is required to travel through the another road segment when the subject vehicle travels through the another road segment if a day category corresponding to the traveling date on which the subject vehicle is expected to travel is the second day category; and
calculating by the estimated time of arrival calculator, an estimated time of arrival at which the subject vehicle is expected to arrive at the destination based on a current time point and a sum of lengths of traveling times, each of which is the length of traveling time having been respectively extracted for the road segments constituting the recommended route.

12. A route search method according to claim 11, wherein:
when a road segment not located in a first area in which the start point is located but located in a second area corresponding to a different day category from the first area constitutes the recommended route, a date and a time on which the subject vehicle is expected to start traveling the road segment located in the second area are calculated, and, based on the date and the time calculated, the day category corresponding to the road segment located in the second area is identified.

13. A route search method according to claim 12, wherein:
the estimated time of arrival is calculated by assuming a date and a time on which the subject vehicle is expected to end traveling road segments located in the first area as a date and a time on which the subject vehicle is expected to start traveling road segments located in the second area.

14. A route search method according to claim 11, further comprising:
displaying the estimated time of arrival on a display.

15. A route search method according to claim 12, further comprising:
displaying the estimated time of arrival on a display.

16. A route search method according to claim 13, further comprising:
displaying the estimated time of arrival on a display.

17. A route search method, comprising:
detecting, by a current position detector, a current position of a subject vehicle;

identifying, by an estimated time of arrival calculator, a day category on which the subject vehicle is expected to travel, for each of a plurality of road segments;

for a road segment:
  extracting, by the estimated time of arrival calculator, by referencing statistical traffic information in a storage, a first length of time which is required to travel through the road segment on a first day category based on statistics of past traffic information on the first day category as a length of traveling time which is required to travel through the road segment when the subject vehicle travels through the road segment if a day category corresponding to a traveling date on which the subject vehicle is expected to travel is the first day category, and, for another road segment constituting the recommended route,
  extracting, by the estimated time of arrival calculator, by referencing the statistical traffic information in the storage, a second length of time which is required to travel through the another road segment on a second day category based on statistics of past traffic information on the second day category as a length of traveling time which is required to travel through the another road segment when the subject vehicle travels through the another road segment if a day category corresponding to the traveling date on which the subject vehicle is expected to travel is the second day category; and
  searching by a route searcher, for a recommended route from a start point to a destination of the subject vehicle based on a sum of lengths of traveling times, each of which is the length of traveling time having been respectively extracted for the road segments.

18. A route search method according to claim 17, wherein:
a date and a time on which the subject vehicle is expected to start traveling a road segment not located in a first area in which the start point is located but located in a second area corresponding to a different day category from the first area are calculated, and, based on the date and the time calculated, the day category corresponding to the road segment located in the second area is identified.

19. A route search method according to claim 17, further comprising:
displaying, on a display, an estimated time of arrival at which the subject vehicle is expected to arrive at the destination.

20. A route search method according to claim 18, further comprising:
displaying, on a display, an estimated time of arrival at which the subject vehicle is expected to arrive at the destination.

* * * * *